Figure 4A:
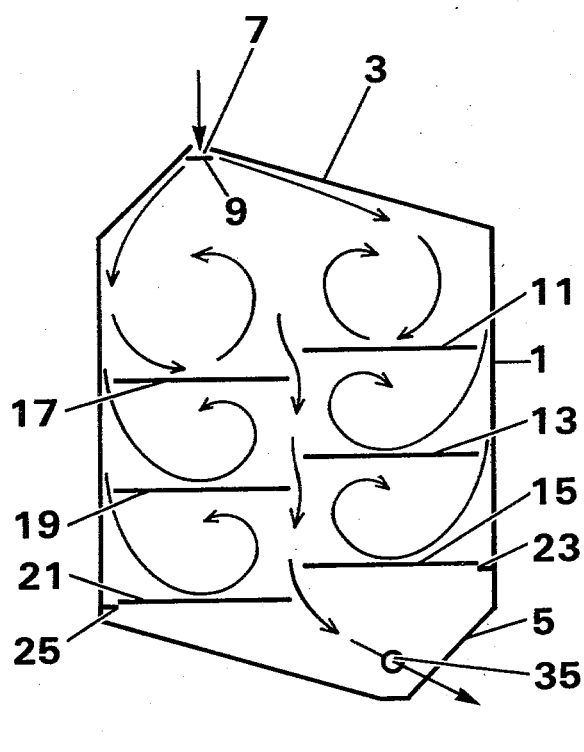
Figure 5A:
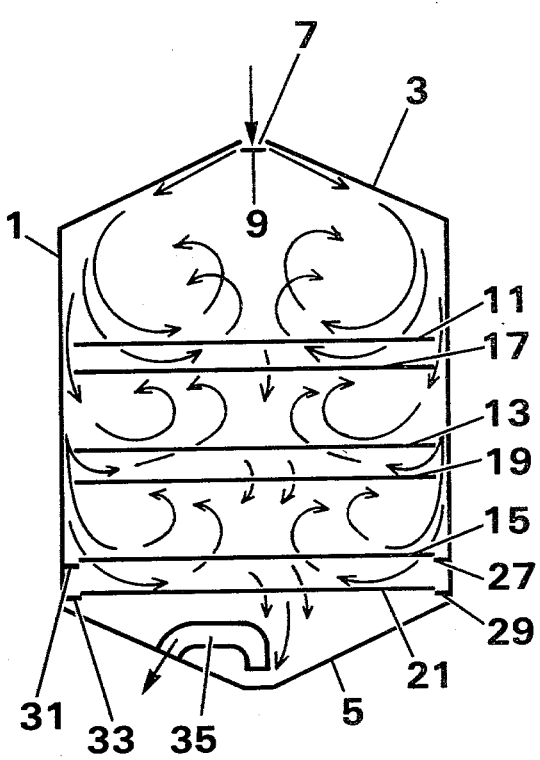
Figure 4B:
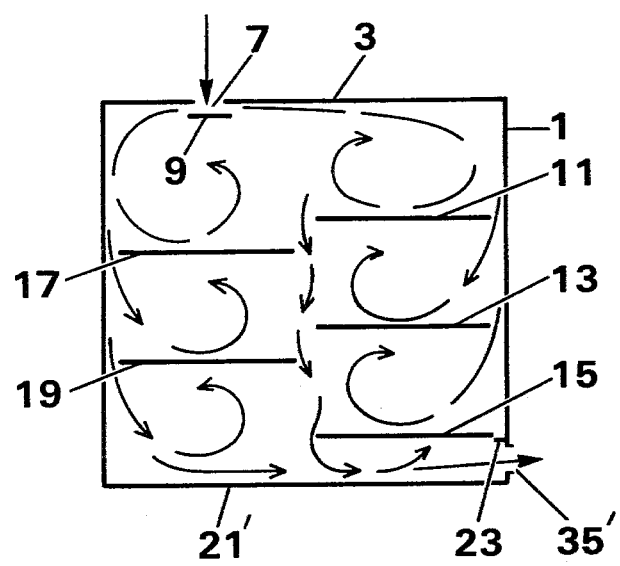
Figure 5B:
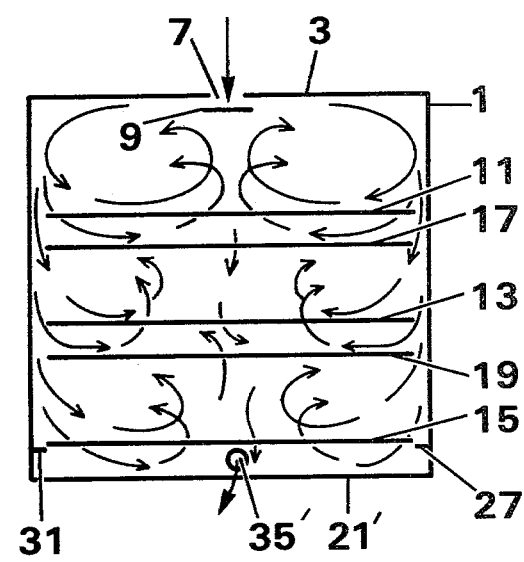

United States Patent [19]

Moss

[11] 4,216,741
[45] Aug. 12, 1980

[54] EXPOSURE CHAMBER

[75] Inventor: Owen R. Moss, Kennewick, Wash.

[73] Assignee: Hazleton Systems, Inc., Aberdeen, Md.

[21] Appl. No.: 17,519

[22] Filed: Mar. 5, 1979

[51] Int. Cl.$^2$ .............................................. A01K 1/03
[52] U.S. Cl. ....................................... 119/15; 119/17; 119/33; 47/1.1; 47/17; 62/417
[58] Field of Search ..................... 119/15, 17, 19, 21, 119/30, 31, 33; 47/1.1, 17; 62/414, 417

[56] References Cited

U.S. PATENT DOCUMENTS

| | | | |
|---|---|---|---|
| 3,302,615 | 2/1967 | Tietje | 119/15 |
| 3,557,756 | 1/1971 | Ramsey | 119/15 |
| 3,630,174 | 12/1971 | Runkel | 119/15 |
| 3,749,061 | 7/1973 | Connelly | 119/19 |
| 3,877,420 | 4/1975 | Eagleson, Jr. | 119/15 |
| 3,924,571 | 12/1975 | Holman | 119/15 |

OTHER PUBLICATIONS

William I. Gay, Method of Animal Experimentation, 1973, pp. 1–43.

*Primary Examiner*—Hugh R. Chamblee
*Attorney, Agent, or Firm*—Robert Keith Sharp; Joseph J. Hauth

[57] ABSTRACT

A chamber for exposing animals, plants, or materials to air containing gases or aerosols is so constructed that catch pans for animal excrement, for example, serve to aid the uniform distribution of air throughout the chamber instead of constituting obstacles as has been the case in prior animal exposure chambers. The chamber comprises the usual imperforate top, bottom and side walls. Within the chamber, cages and their associated pans are arranged in two columns. The pans are spaced horizontally from the walls of the chamber in all directions. Corresponding pans of the two columns are also spaced horizontally from each other. Preferably the pans of one column are also spaced vertically from corresponding pans of the other column. Air is introduced into the top of the chamber and withdrawn from the bottom. The general flow of air is therefore vertical. The effect of the horizontal pans is based on the fact that a gas flowing past the edge of a flat plate that is perpendicular to the flow forms a wave on the upstream side of the plate. Air flows downwardly between the chamber walls and the outer edges of the pan. It also flows downwardly between the inner edges of the pans of the two columns. It has been found that when the air carries aerosol particles, these particles are substantially uniformly distributed throughout the chamber.

13 Claims, 8 Drawing Figures

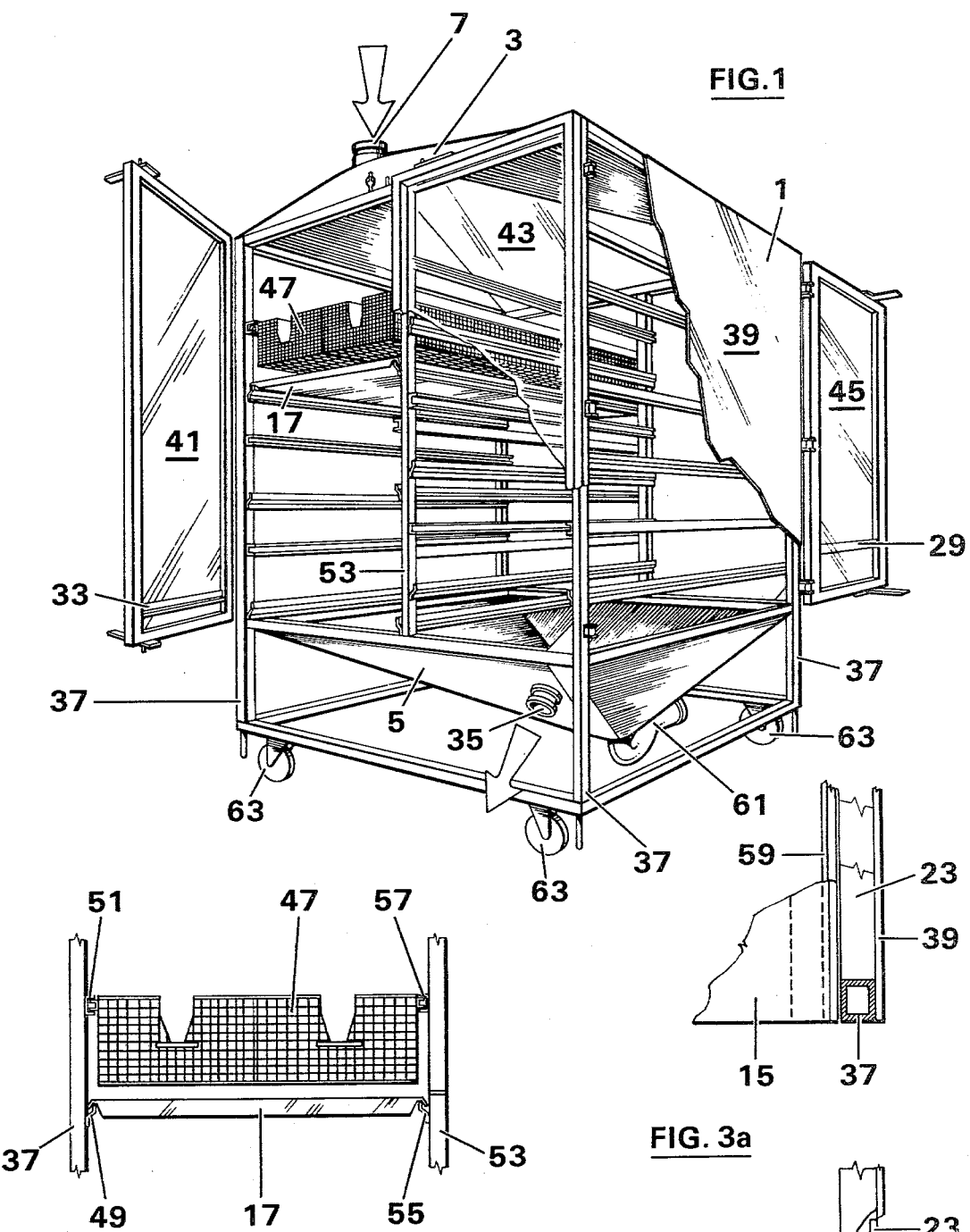

EXPOSURE CHAMBER

INTRODUCTION

This invention relates to an exposure chamber. Such chambers are used to expose experimental animals to gases, usually air containing other gases or aerosols, to similarly expose various kinds of plant life and for processes such as smoking meat.

The object of the invention is to provide such a chamber which is economical in use of space, which will permit the uniform exposure of a number of animals, plants or objects to a given atmosphere and at the same time provide protection of animals from the excreta of others.

BACKGROUND

A great many types of animal exposure chambers are known in the prior art. In some, the chamber is divided into compartments with individual air supply to each. This type structure requires relatively complicated piping and it is difficult to assure that all animals receive uniform exposure.

In a common type, a plurality of cages are positioned in an undivided chamber, in several layers, and there is a unitary air supply. In such chambers animal excreta catch pans beneath the cages presented a barrier which tended to prevent uniform delivery of the atmosphere to all animals. Either catch pans were omitted, subjecting animals in the lower cages to the excreta of those above, or the chambers were made very large in relation to the size of the cages and catch pans, or internal fans were provided in an attempt to secure uniform distribution. To avoid the problem of uniform distribution and the problem of stress on the lower animals, most exposure systems and chambers are based on research related to one layer of animals being exposed. When cages are stacked, it has been considered necessary to rotate the animals by moving the lowermost cages to the top from time to time.

For an extensive discussion of exposure chambers, see Robert T. Drew and Sydney Laskin "Environmental Exposure Chambers", pages 1 through 41 of Volume 11 of "Methods of Animal Experimentation", edited by William I. Gray, published 1973 by Academic Press. See also R. Carpenter, "Cones, Cone Angles, Plenums and Manifolds", Workshop on Inhalation Technology, Brookhaven National Laboratory, Oct. 16-17, 1978.

SUMMARY OF THE INVENTION

This invention converts the catch pans of animal exposure chambers from obstacles to the uniform distribution within the chamber to instruments for its attainment. It is based on the fact that a gas flowing past the edge of a flat plate that is perpendicular to the flow forms a wave on the upstream side of the plate.

The application of this physical phenomenon to the above problem was as follows: If exposure aerosol is directed downward, along the walls of the chamber, each catch pan positioned away from the walls but filling the center cross section of the chamber will produce four waves (one along each edge), capable in their interaction of providing the energy to maintain a well-mixed aerosol over each cage unit provided that there is an exit available for the nonmoving air in the center of the pan. Uniform mixing over the region above the center of each pan can be obtained by splitting each pan in half along its front-to-back center line (as it sits in the chamber), and shifting both halves slightly apart horizontally and, preferably, vertically; making six tiers of rectangular catch pans, each having half the area of the original pan and positioned in two offset vertical columns of three. The resulting flow through what previously was a center line of the initial, large square catch pans, combined with the mixing action of the waves, produces mixing in the space occupied by animal caging units above each of the smaller, rectangular, catch pans. Baffle plates must be placed between the chamber walls and the three outer edges of the bottom catch pan in each of the two columns, or those pans extended to the walls, in order to insure that a maximum flow of fresh exposure atmosphere passes over the animal cages above these pans.

The above approach was based on two assumptions. (1) The aerosol or exposure atmosphere supplied to the top of the chamber was uniformly mixed and of constant concentration with a mass media aerodynamic diameter, for the case of an aerosol, of less than 5 $\mu$m. And (2) the aerosol was introduced into the animal caging portion of the chamber as uniform flow moving downward along each wall and not as a stream through the center of the chamber.

To secure this flow down the side walls, the air inlet is mounted on a transition piece and a deflector is provided adjacent the inlet to direct the air toward the walls. The transition piece may be simply a horizontal plate or it may be in the form of a pyramid.

The distance between the edges of the pans and the vertical walls should be sufficient to permit substantial flow of air along the walls but small compared to the horizontal dimensions of the pans. A range of 1/20 to 1/5 the width of the pans is satisfactory.

The horizontal and vertical distances between corresponding pans of the two columns are interrelated. If adequate space is available horizontally, the vertical displacement between the pans may be reduced to zero, that is, the pans of the two columns may occupy the same levels. In this case, the pans should be spaced horizontally from each other about the same distance that they are spaced from the walls and the inlet should be centered. At the other extreme, the pans of a pair might be vertically spaced by half the spacing of the pans in a column, with very little horizontal distance between them. Typically, the horizontal space is about half the distance of the pans from the walls and the vertical space between pans of a pair is about ⅓ the vertical space in a column. Since the flow through the center of the chamber is sinuous, the diagonal edge to edge distance between the edges of the pans of a given pair, which defines the aperture through which the air flows, is of importance and should be such that the resistance to flow through the center of the chamber is similar to that around the periphery.

The optimum width of the peripheral space is affected by the shape of the transition piece. If the latter is a flat plate, the optimum peripheral space is wider than if the transition piece is pyramidal.

In some cases, the spaces between the walls, and the outer edges of the pans and between the inner edges of the pans may be varied, the peripheral spaces decreasing and the inner spaces increasing, from top to bottom of the chamber. This has some advantages from an aerodynamic standpoint, but it complicates the structure mechanically and is usually unnecessary.

The essential requirements are that the peripheral space around each pan is sufficient to supply the air to the pans below it, and that the space between the inner edge of any pair of pans is sufficient to exhaust air from the pans above it.

The vertical spacing between pans in the same column should be sufficient to permit formation of the waves across the full width of each pan. A spacing of ¼ the width of the pan, or more, appears satisfactory.

The inlet can be either at the top or bottom of the chamber. Preferably, however, it is at the top, particularly when an aerosol is being handled, since in this case gravity works in conjunction with, rather than opposed, to the carrying power of the fluid on the aerosol particles. Also, if the inlet is at the bottom, a pair of otherwise useless pans or shelves may have to be provided above the uppermost cages to secure proper distribution of air flow.

While the above discussion has been concerned in terms of an animal exposure chamber, which is the embodiment of the invention which is preferred at present, it will be understood that the aerodynamic principles discussed are equally applicable to other types of exposure chambers, and that the "pans" might be drip pans for plant-growing trays or for meat or fish, or simply shelves and that the "cages" might be trays for one kind or another of plant life, or baskets for meat or fish, so long as they are of open construction, so as not to disrupt the air flow.

DESCRIPTION OF THE DRAWING

In the drawings:

FIG. 1 is a perspective view of a chamber with pans omitted and parts broken away;

FIG. 2 is a fragmentary front view of a cage and its catch pan;

FIGS. 3*a* and 3*b* are fragmentary views of the lowermost right hand catch pan in relation to the side walls;

FIGS. 4*a* and 4*b* are flow diagrams of two forms of chamber, viewed from the front;

FIGS. 5*a* and 5*b* are flow diagrams of two forms of chamber, viewed from the side.

DETAILED DESCRIPTION

Referring to FIGS. 4*a* and 5*a*, one form of chamber comprises vertical walls 1 and transition pieces 3 and 5, located at the top and bottom of the casing, respectively. The two transition pieces are shown as irregular pyramids. In the upper transition piece 3 is an inlet 7. Beneath the inlet is a deflector 9. Within the chamber are a plurality of catch pans 11, 13, 15, 17, 19 and 21. As is best seen in FIG. 4*a*, these pans are arranged in two columns. The corresponding pans of the left hand column are positioned below and spaced horizontally from the corresponding pans in the right hand column. Thus pan 17 is below and to the left of the pan 11. All the pans are spaced from the vertical walls of the chamber. FIG. 4*a* shows the spacing from the side walls while FIG. 5*a* shows the spacing from the front and rear walls. Between the walls and the lowermost pans 15 and 21 there are deflectors 23, 25, 27, 29, 31 and 33. If desired, these deflectors could be made integral with the pans, i.e., pans 15 and 21 could extend to walls 1. Beneath the lowermost pans is an air outlet 35.

The arrows indicate the general flow of air. It will be noted that above each pan there is an eddy which causes circulation throughout the length and breadth of the chamber. The air flows downwardly around the outer edges of the pans and also flows downwrdly through the center between the adjacent edges. The baffles around the edges of the lowermost pans serve to divert the air over them and prevent its premature escape to the outlet 35.

FIGS. 4*b* and 5*b* are flow diagrams of a modified form. In this case, upper transition piece 3 is simply a flat plate, lower transition piece 5 is omitted, pan 21 is extended, becoming floor 21' of the chamber, and air outlet 35' is located in wall 1. This form of chamber may be a room of a building.

As will later be shown by an experimental example, this arrangement produces substantially uniform distribution of the air and any aerosol or gaseous contents throughout the chamber.

DESCRIPTION OF THE PREFERRED EMBODIMENT

The embodiment of the invention which is preferred at the present time is shown in FIGS. 1, 2, 3A and 3B. FIG. 1 shows the chamber in a perspective view. The vertical side walls 1 are formed of cornerposts 37 and sheet metal plates 39. At the front and rear respectively are glass doors 41, 43, 45. The fourth glass door at the rear is not shown in this view. The interior of the chamber is filled with animal cages and associated catch pans. In order to facilitate illustration only the catch pan 17 and its corresponding animal cage 47 are shown.

Referring to FIG. 2, it will be seen that catch pan 17 rests on tracks 49 while cage 47 slides within channels 51. In addition to the cornerposts 37, the chamber includes front and rear centerposts 53 which support tracks 55 and 57 for the inner edges of catch pan 17 and cage 47 respectively. Since track 49 and channel 51 are mounted on the inner side of corner posts 57, it will seem that catch pan 17 is spaced from the sheet metal plate 39 of the chamber by the width of the cornerposts. Also it will be apparent from FIG. 1 that the tracks for the right and left hand columns of pans are positioned on opposite sides of the centerposts 53. The inner edges of the pans are therefore spaced from each other.

Fragmentary views 3A and 3B show the relationship of the pan 15, that is, the lowermost pan in the right hand column, to the cornerpost and side wall. Here again the track 59 is on the inner surface of the cornerpost 37 but the deflector 23, in the form of an angle iron, substantially fills the space between the pan and the side plate 39. There is a corresponding deflector in each door, of which 29 and 33 are shown in FIG. 1. The upper transition piece 3 is in this case made in the form of an irregular pyramid and is provided at its apex with the inlet 7. It will be noted that the inlet 7 is directly above the left hand column of cages and catch pans. The deflector 9 (FIGS. 4 and 5) is directly beneath the inlet 7 but is not visible in this view. The lower transition piece 5 includes the air outlet 35 and liquid drain 61. To provide for proper drainage when the chamber is washed, the lower transition piece 5 is made in the form of an inverted pyramid. For economy in manufacture, it is made substantially identical to upper transition piece 3. For ease in handling the chamber is mounted on casters 63.

EXPERIMENTAL EXAMPLE

The chamber of FIG. 1, having catch pans spaced away from the walls in two offset columns with the bottom pan in each column having the space between its three outer edges and chamber wall sealed off with a baffle, was reduced to practice in a chamber requiring three levels of animals and having dimensions of 50" (127 cm) wide by 49" (124.5 cm) deep by 6'10" (208.3 cm) high with an animal caging (and exposure) section 49" (124.5 cm) high. Six catch pans 23" (58.4 cm) total width, by 47" (119.4 cm) total length) in two vertical columns were placed inside the chamber. Animal caging units were suspended above each of the catch pans. The horizontal distance between the two columns was $\frac{3}{4}$" (1.9 cm). The left column of catch pans was 4" (10 cm) lower than the right. The vertical distance between catch pans was $13\frac{7}{8}$" (35.3 cm). The long side of each catch pan, closest to the stainless steel chamber wall, was spaced away from the wall by $1\frac{1}{4}$" (3.2 cm). The ends of each catch pan are spaced $1\frac{1}{4}$" (3.2 cm) away from the tempered glass panes in the front and back doors of the chamber. To meet assumption #2 of the "summary", both for flow down, along the inner surfaces of the chamber and for prevention of air streaming through the middle of the chamber, a baffle was placed in the inlet line and the inlet and exhaust ports for the chamber were not centered with respect to the cross section of the chamber. The inlet was centered above the lowest column of catch pans while the exhaust was centered below the highest column of catch pans. The height of the top and bottom transition pieces was determined by the constraints placed on the total height of the chamber. The inlet baffle consisted of a circular disk positioned 1" (2.5 cm) below the inlet transition piece junction.

The tests made to evaluate the performance on this chamber consisted of measuring the concentration and buildup time in the chamber of an exposure atmosphere composed of an aerosol having a mass median aerodynamic diameter less than 5 microns introduced as a uniform concentration stream at the top inlet. The concentration, irrespective of catch pan location, was determined by comparing measurements of steady state aerosol mass concentration above each of the catch pans and by measuring concentration as a function of position above any one of the six shelves. The concentration buildup as a function of time for the aerosol over each of the six catch pans was graphed and compared with what would be expected for a perfectly mixing box. To be equivalent to existing chambers of the same size, the steady state aerosol concentration as a function of position would have to be within 10% and, for ten air changes an hour, the buildup vs. time curve should be near exponential in shape with a buildup/clearance half time of approximately 6 minutes.

A uranine aerosol having mass median diameter of 0.9 μm with a geometric standard deviation of 2 was used for all of the tests. Three runs were made with filter paper samples obtained from probes centered in the space above each of the six catch pans. The six samples were taken simultaneously of an aerosol concentration near 2 μg/l. The standard deviation for each set of six samples was 0.14, 0.06, and 0.06 μg/l representing 6.3, 3.0 and 3.1% of the mean concentration. Four filter paper samples, taken in pairs of two, positioned 11 inches in from each end of shelf number 3, had a standard deviation of 0.05 μg/l or 2.6% of the mean concentration. Four filter paper samples above pans 11, 13, and 15 (centered above and positioned 11 inches from the front end of each pan) were taken simultaneously. The standard deviation was 0.04 μg/l or 3.3% of the mean concentration. Buildup/clearance half times for shelves 11 through 21 were between 5 and 6.5 minutes with delay times on the lowest four shelves of one to two minutes. The test chamber having solid catch pans worked as well as or better than exposure chambers of the same size having no catch pans.

While I have described in detail a specific embodiment, which represents the presently preferred form of my invention, various changes can be made. Thus, as indicated above, the upper transition piece may be simply a horizontal plate. The distance between pans and the vertical walls would then be made greater than given in my experimental example. The flow of air could be from bottom to top. (In that case, deflectors around the lowermost pans would be omitted. Pans, surrounded by deflectors or extending to the walls, would be placed above the uppermost cages to direct the flow of air over them.)

Still other variations will be obvious to those skilled in the art. I, therefore, intend my invention to be limited only by the scope of the appended claims.

The embodiments of the invention in which a proprietary right or privilege is claimed are defined as follows:

1. An exposure chamber comprising (a) imperforate substantially vertical front, rear and side walls and closed upper and lower ends;

(b) a gas inlet in one of said ends;

(c) a gas outlet in the other of said ends;

(d) an inlet deflector adjacent said inlet constructed and arranged to deflect gas introduced at said inlet toward said substantially vertical walls;

(e) a plurality of imperforate, substantially horizontal pans within said chamber, each of said pans, other than that most remote from said inlet, being spaced from said vertical walls by distances which are sufficient to permit flow of air along said walls sufficient to supply sufficient gas to pans downstream of it but which are small compared to the horizontal dimensions of the pans, said pans being arranged in horizontally positioned pairs, the pans of each pair being horizontally spaced from each other a distance which is sufficient to exhaust gas from said pans and the pans upstream of them but which is small compared to the horizontal dimensions of said pans;

(f) means constructed and arranged to prevent substantial flow of air between said vertical walls and the pan most remote from said inlet; and (g) support means of open structure supported above at least some of said pans.

2. An exposure chamber as defined in claim 1, wherein the pans of each pair are also spaced vertically from each other.

3. An exposure chamber as defined in claim 1 wherein a plurality of pans are arranged in each of two vertical columns each pan of one column being spaced vertically and horizontally from an adjacent pan in the other column.

4. An exposure chamber as defined in claim 3, wherein said inlet is in alignment with the column in which the pans have a greater distance vertically from said inlet than the adjacent pans in the other column.

5. An exposure chamber as defined in claim 1 wherein said gas inlet is at the top of said chamber.

6. An exposure chamber as defined in claim 2, wherein said gas inlet is at the top of said chamber.

7. An exposure chamber as defined in claim 3, wherein said gas inlet is at the top of said chamber.

8. An exposure chamber as defined in claim 4, wherein said gas inlet is at the top of said chamber and is aligned with the column in which the pans are lower than the adjacent pans of the other column.

9. An exposure chamber as defined in claim 8, and comprising an upper transition piece which is an irregular pyramid having its apex in vertical alignment with the column in which the trays are lower than the adjacent trays of the other column and wherein said gas inlet and said inlet deflector are adjacent said apex.

10. An exposure chamber as defined in claim 9, and comprising a lower transition piece which is an inverted pyramid having a liquid outlet at its apex and wherein said air outlet is positioned in said lower transition piece above said apex.

11. An exposure chamber as defined in claim 8 and comprising deflectors between the lowermost pan of each column and each of said vertical walls.

12. An exposure chamber is defined in claim 1 wherein the distances between said pans and said vertical walls are in the range of substantially 1/20 to substantially 1/5 of the minimum horizontal dimension of said pans.

13. An exposure chamber as defined in claim 1, wherein said support means are cages for animals.

* * * * *